May 17, 1927.
J. NORDSTOG
1,628,799
HARROW
Filed Oct. 7, 1926
2 Sheets-Sheet 1
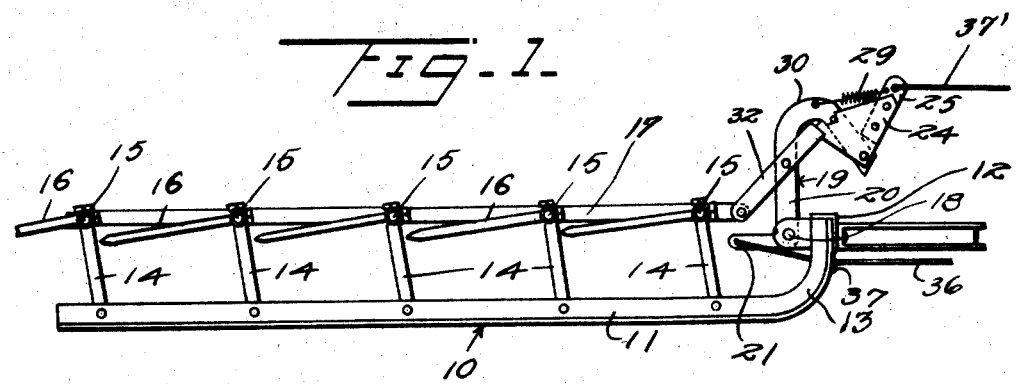
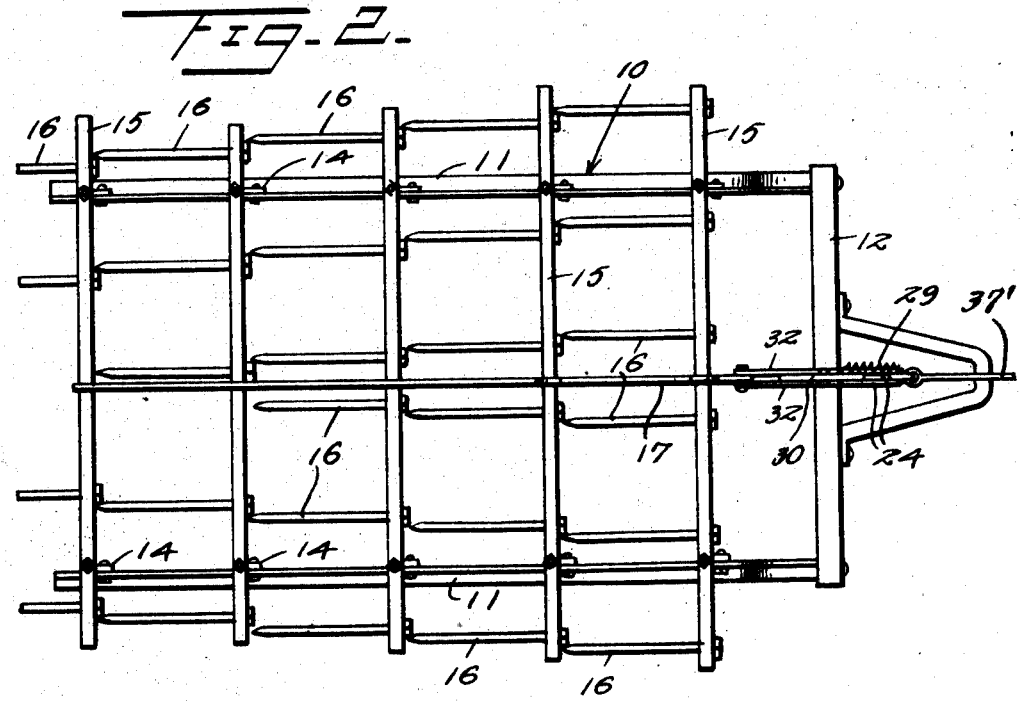
Inventor
John Nordstog
By Watson E. Coleman
Attorney May 17, 1927.

J. NORDSTOG

HARROW

Filed Oct. 7, 1926

Inventor
John Nordstog

By Watson E. Coleman
Attorney

Patented May 17, 1927.

1,628,799

UNITED STATES PATENT OFFICE.

JOHN NORDSTOG, OF CROSBY, NORTH DAKOTA.

HARROW.

Application filed October 7, 1926. Serial No. 140,140.

This invention relates to harrows and more particularly to a harrow of the type shown in my prior patent, granted March 31, 1925, for cultivators, No. 1,531,453.

An important object of the invention is to provide a novel and improved means controlling the movement of the tooth supporting bars of the harrow to permit control thereof from the tractor element by means of which the harrow is being drawn over the ground.

A further and more specific object of the invention is to provide a control lock, which serves both as a means for causing the tooth supporting bars and teeth thereof to move into ground engaging position and to return the tooth supporting bars and their teeth to the inoperative position.

A further object of the invention is to provide a construction of this character eliminating the necessity for springs or similar means for shifting the teeth into ground engaging position.

These and other objects I attain by the construction shown in the accompanying drawings, wherein for the purpose of illustration is shown a preferred embodiment of my invention and wherein:—

Figure 1 is a side elevation of a harrow constructed in accordance with my invention;

Figure 2 is a plan view thereof;

Figure 3 is an enlarged longitudinal sectional view through the forward end of the harrow;

Figure 4 is an enlarged plan view of the control member.

Referring now more particularly to the drawings, the numeral 10 generally designates a frame including runners 11 connected at their forward ends by a transverse bar 12, the forward ends of these runners being upturned, as at 13, to facilitate their passage over the ground. Each runner is preferably formed from angle-iron and has the stem flange thereof vertically directed. To this flange are pivoted longitudinally spaced links 14, the ends of which are rigidly connected to transversely extending tooth supporting bars 15 having removable teeth 16. The bars are so connected with the links that the teeth thereof, when the links are substantially vertically directed, substantially parallel the runners and accordingly the ground over which the runners are passing and when the bars are horizontally directed, the teeth are vertically directed and project below the lower faces of the runners for engagement with the ground. The tooth supporting bars 15 are connected for simultaneous movement from one to the other of these positions by a longitudinally extending bar 17 through which each of the parts 16 is rotatably directed.

The structure hereinbefore recited is substantially identical with that employed in my prior patent above mentioned. In accordance with the present invention, I provide at the center of the front bar 12 a transversely extending horizontal pivot 18 upon which I mount a bell crank 19 at the angle between the arms 20 and 21 thereof. The arm 20, which is substantially vertically directed, is provided at its free end with a hook 22. Pivoted at opposite sides of the bill of the hook upon a pivot 23 extending through the bill of the hook are plates 24 rigidly connected to one another by rivets extending through the plates and through a member 25 providing an ear having an opening 26 for the reception of a trip rope. Extending through the hook is a pin 27, the ends of which operate in arcuate notches 28 formed in the plates 24 to limit the movement of these plates about their pivot. A spring 29 is connected with the ear 25 and with the bight 30 of the hook and constantly urges the plates to a position where the forward end walls 31 of the notches 28 engage against the ends of the pins 27. Pivoted to opposite sides of the arm 20 are levers 32 having their forward faces at their upper ends thereof adapted for engagement against shoulders 33 on the plates 24 when the plates 24 are in their normal position, as determined by the spring 29. The rear or lower ends of the levers 32 extend upon opposite sides of the forward end of the bar 17 and are connected thereto by a pivot 34. The free end of the arm 21 of the bell crank lever 19 has an opening 35 in which is secured the rear end of a draft cable 36 which is passed through a guide 37 carried by the front bar to a suitable point of attachment upon the tractor element (not herein illustrated).

When the device is being transported from place to place, the upper ends of the levers 32 engage against the shoulders 33, so that these levers may not move in the direction of the arrow A of Figure 3 about their pivots. Since the pull on the cable 36 will constantly urge the arm 20 in the direction of the arrow B of this figure, it will be obvious that a lock joint is provided, for in order for the bar 17 to move rearwardly and thus permit the teeth 16 to engage with the ground, the lever 32 must move in the direction of the arrow A, while the bell crank lever moves in the direction of the arrow B. The movement of the lever 32 being prevented, the bell crank lever 19 becomes rigid, so that the hitch pull only operates to drag the cultivator over the ground upon the runners 11. In order to move the teeth to operative position, it is merely necessary to twitch the trip rope 37' engaged in the opening 26. This moves the plates 24 to a position permitting escape of the forward or upper ends of the levers 32, so that the pull exercised by the cable 36 may rotate the bell crank 19, positively forcing the bar 17 rearwardly and bringing the teeth into operative position. It is pointed out that by this construction, the pull exercised upon the cultivator, when the teeth are in ground engaging position, serves to forcibly maintain the teeth in said position. When it is desired to restore the teeth to inoperative position, the trip rope 37' is engaged with the hand and pulled forwardly until the pins 27 engage against the rear walls 38 of the notches 28 and these walls serve to hold the latch rigid to the bell crank lever. A continuation of the pull will, therefore, cause the bell crank lever 19 and more particularly the arm 20 thereof to be drawn forwardly and upwardly, moving the teeth to their inoperative position. When the inoperative position is reached, the pull upon the trip rope 37' may be suddenly released, so that the levers 32 will engage the shoulders 33 and lock the bell crank lever in position.

It will be noted that by this construction, it is possible to move the teeth to either operative or inoperative position from the traction device, thus saving considerable time when it is necessary to move the cultivator over ground, portions of which are not to be or, for some reason, may not be cultivated. It will, of course, be obvious that a suitably supported guide pulley may be provided for the trip rope 36, if so desired.

It will also be obvious that the construction hereinbefore set forth is capable of a certain range of change and modification without materially departing from the spirit of the invention and I accordingly do not limit myself to such specific structure except as hereinafter claimed.

I claim:—

1. In a harrow, a frame including side members having upturned forward ends, a cross bar connecting said forward ends, a plurality of longitudinally spaced links pivoted to the side members, transversely extending bars to which the ends of corresponding links of the side members are rigidly connected, ground working implements carried by the transversely extending bars and projecting therefrom at an angle to said links, a longitudinally extending bar connecting the transverse bars for simultaneously shifting the same to move the ground engaging implements into or out of engagement with the ground, a lever pivoted intermediate its ends to the cross bar, a second lever pivoted at one end to the longitudinally extending bar and intermediate its ends to one end of the first named lever and a latch limiting relative rotation of said levers about the pivotal connection thereof at a point positioning the longitudinal bar to retain the ground working implements out of engagement with the ground and a draft element connected with the opposite end of the first named lever.

2. In a harrow, a frame including side members having upturned forward ends, a cross bar connecting said forward ends, a plurality of longitudinally spaced links pivoted to the side members, transversely extending bars to which the ends of corresponding links of the side members are rigidly connected, ground working implements carried by the transversely extending bars and projecting therefrom at an angle to said links, a longitudinally extending bar connecting the transverse bars for simultaneously shifting the same to move the ground engaging implements into or out of engagement with the ground, a lever pivoted intermediate its ends to the cross bar, a second lever pivoted at one end to the longitudinally extending bar and intermediate its ends to one end of the first named lever, a latch limiting relative rotation of said levers about the pivotal connection thereof at a point positioning the longitudinal bar to retain the ground working implements out of engagement with the ground, a draft element connected with the opposite end of the first named lever, a spring normally maintaining the latch in operative position, means for withdrawing the latch from its operative position, means limiting the withdrawal of the latch and a draft element for withdrawing the latch.

3. In a harrow, a frame including side members having upturned forward ends, a cross bar connecting said forward ends, a plurality of longitudinally spaced links pivoted to the side members, transversely extending bars to which the ends of corresponding links of the side members are rigidly connected, ground working implements carried by the transversely extending bars and projecting therefrom at an angle to said links, a longitudinally extending bar connecting the transverse bars for simultaneously shifting the same to move the ground engaging implements into or out of engagement with the ground, a lever pivoted intermediate its ends to the cross bar, a second lever pivoted at one end to the longitudinally extending bar and intermediate its ends to one end of the first named lever, a latch limiting relative rotation of said levers about the pivotal connection thereof at a point positioning the longitudinal bar to retain the ground working implements out of engagement with the ground, a draft element connected with the opposite end of the first named lever, a spring normally maintaining the latch in operative position, means for withdrawing the latch from its operative position, means limiting the withdrawal of the latch, and a draft element for withdrawing the latch, said latch being pivoted to the first named lever whereby a pull upon the last named draft element exercises a pull moving the latch to inoperative position and subsequently shifting the first named lever to thereby shift the second named lever and said longitudinally extending bar to move the ground working implements to inoperative position.

4. In combination with a harrow including a frame, a plurality of ground working implements carried thereby and movable into or out of engagement with the ground, a member movable longitudinally of the harrow controlling the ground working implements in their movement, a draft element, a connection between the draft element and member whereby during the application of strain to the draft element the member is urged to a position where the ground working implements engage the ground, said connection including a lever pivoted intermediate its ends to the frame, a second lever pivoted intermediate its ends to one end of the first named lever and at its rear end to the forward end of said member, a latch pivoted to said end of the first named lever and normally spring-positioned in the path of the forward end of the last named lever and means for withdrawing the latch and for exercising upon said end of the first named lever a pull to thereby shift the ground working implements out of engagement with the ground, the opposite end of the first named lever being adapted for connection with a draft element.

5. In a harrow, a frame adapted to move over the ground, a plurality of ground working implements carried by the frame and movable into and out of engagement with the ground, a longitudinally extending bar carried by the frame and having connection with the ground working implements controlling them in their movements, a lever pivoted intermediate its ends to the frame, a second lever pivoted at one end to the longitudinally extending bar and intermediate its ends to one end of the first named lever and a latch limiting relative rotation of said levers about the pivotal connection thereof at a point positioning the longitudinal bar to retain the ground working implements out of engagement with the ground and a connection between the opposite end of the first named lever and a draft element.

6. In a harrow, a frame adapted to move over the ground, a plurality of ground working implements carried by the frame and movable into and out of engagement with the ground, a longitudinally extending bar carried by the frame and having connection with the ground working implements controlling them in their movements, a lever pivoted intermediate its ends to the frame, a second lever pivoted at one end to the longitudinally extending bar and intermediate its ends to one end of the first named lever, a latch limiting relative rotation of said levers about the pivotal connection thereof at a point positioning the longitudinal bar to retain the ground working implements out of engagement with the ground, a connection between the opposite end of the first named lever and a draft element, and means continuously operable to initially withdraw the latch and subsequently exercise a pull upon the first named end of the first named lever to thereby move said lever in a direction drawing the ground working implements out of engagement with the ground.

In testimony whereof I hereunto affix my signature.

JOHN NORDSTOG.